US010762672B2

(12) United States Patent
Bergner et al.

(10) Patent No.: US 10,762,672 B2
(45) Date of Patent: Sep. 1, 2020

(54) DEVICE AND METHOD FOR RECONSTRUCTING AN X-RAY COMPUTED TOMOGRAPHY IMAGE

(71) Applicant: KONINKLIJKE PHILIPS N.V., Eindhoven (NL)

(72) Inventors: Frank Bergner, Hamburg (DE); Bernhard Johannes Brendel, Norderstedt (DE); Thomas Koehler, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 124 days.

(21) Appl. No.: 15/763,140

(22) PCT Filed: Oct. 19, 2016

(86) PCT No.: PCT/EP2016/075115
§ 371 (c)(1),
(2) Date: Mar. 26, 2018

(87) PCT Pub. No.: WO2017/067997
PCT Pub. Date: Apr. 27, 2017

(65) Prior Publication Data
US 2018/0286086 A1 Oct. 4, 2018

(30) Foreign Application Priority Data
Oct. 20, 2015 (EP) ..................................... 15190581

(51) Int. Cl.
*G06T 11/00* (2006.01)

(52) U.S. Cl.
CPC ....... *G06T 11/006* (2013.01); *G06T 2211/424* (2013.01)

(58) Field of Classification Search
CPC ... G06T 11/003; G06T 11/006; G06T 7/0012; G06T 2211/424
See application file for complete search history.

(56) References Cited

U.S. PATENT DOCUMENTS

2003/0156684 A1 8/2003 Fessler
2012/0177274 A1 7/2012 Koehler
(Continued)

OTHER PUBLICATIONS

Erdogan et al ("Ordered Subsets Algorithms for Transmission Tomography", Physics in Medicine and Biology, Institute of Physics Publishing, Bristol GB, vol. 44, No. 11, Nov. 1999, pp. 2835-2851, XP001032919, ISSN: 0031-9155, DOI: 10.1088/0031-9155/44/11/311) (Year: 1999).*
(Continued)

*Primary Examiner* — Leon Viet Q Nguyen
(74) *Attorney, Agent, or Firm* — Larry Liberchuk

(57) ABSTRACT

The present invention relates to a device for reconstructing an X-ray tomography image, the device comprising a reconstruction module, which is configured to utilize an ordered subset maximum likelihood optimization with a diagonal paraboloid approximation of a cost function for the reconstructing of the X-ray tomography image; and a calculation module, which is configured to calculate a pre-computable denominator term for the cost function for a plurality of subsets of projection data based on a distribution of diagonal denominator terms over the plurality of the subsets of the projection data.

14 Claims, 5 Drawing Sheets

(56) References Cited

U.S. PATENT DOCUMENTS

2013/0343673 A1   12/2013  Pal
2014/0140599 A1    5/2014  Kim
2014/0369580 A1   12/2014  Yu
2014/0369581 A1   12/2014  Fu

OTHER PUBLICATIONS

Erdogan, et al., "Ordered subsets algorithms for transmission tomography"; Physics in Medicine and Biology; vol. 44, No. 11, Nov. 1999.
Xu, et al., "Parameter optimization of relaxed Ordered Subsets Pre-computed Back Projection (BP) based Penalized-Likelihood (OS-PPL) reconstruction in limited-angle X-ray tomography"; Computerized Medical Imaging and Graphics; vol. 37, No. 4, Apr. 2013.
Schirra, et al., "Spectral CT: a technology primer for contrast agent development"; Contrast Media Mol. Imaging 2014, 9 62-70.
Long, et al., "Multi-Material Decomposition Using StatisticalImage Reconstruction for Spectral CT"; IEEE Transactions on Medical Imaging, vol. 33, No. 8, Aug. 2014.
Fessler, et al., "A Paraboloidal Surrogates Algorithm for Convergent Penalized-Likelihood Emission Image Reconstruction"; In Conference Record of 1998 IEEE Nuc. Sci. Symp. and Med. Im. Conf., vol. 2, pp. 1132-1135.

\* cited by examiner

DEVICE AND METHOD FOR RECONSTRUCTING AN X-RAY COMPUTED TOMOGRAPHY IMAGE

CROSS REFERENCE TO RELATED APPLICATIONS

This application is the U.S. National Phase application under 35 U.S.C. § 371 of International Application No. PCT/EP2016/075115, filed Oct. 19, 2016, published as WO 2017/067997 on Apr. 27, 2017, which claims the benefit of European Patent Application Number 15190581.7 filed Oct. 20, 2015. These applications are hereby incorporated by reference herein.

FIELD OF THE INVENTION

The present invention relates to the field of iterative image reconstruction. Particularly, the present invention relates to a device and a method for reconstructing an X-ray computed tomography image.

BACKGROUND OF THE INVENTION

The field of technology is conventional and spectral, iterative CT reconstruction using the so-called separable paraboloid surrogate, SPS, method with ordered subsets of projection data. This method does a Newton-like update while approximating the Hessian matrix of the cost function with a diagonal matrix. The inverse of this diagonal matrix is called "denominator".

The separable paraboloid surrogate, SPS, method is in iterative reconstruction for CT usually combined with ordered-subsets, i.e. for one image update only a subset of the data is used. This heuristic increases the convergence speed at the cost of a slightly inexact solution. The subsets are usually designed in a way that a small number of equally distributed projections is taken from the full dataset for the calculation of the gradient applied in the Newton-like update.

SUMMARY OF THE INVENTION

There may be a need to improve device and methods for reconstructing a mono- or polyenergetic X-ray computed tomography image.

These needs are met by the subject-matter of the independent claims. Further exemplary embodiments are evident from the dependent claims and the following description.

An aspect of the present invention relates to device for reconstructing an X-ray tomography image, the device comprising: a reconstruction module, which is configured to utilize an ordered subset maximum likelihood optimization with a diagonal paraboloid approximation of a cost function for the reconstructing of the X-ray tomography image. The device further comprises a calculation module, which is configured to calculate a pre-computable denominator term for the cost function for a plurality of subsets of projection data based on a distribution of diagonal denominator terms over the plurality of the subsets of the projection data.

In other words, the reconstructing may be, for instance, iteratively performed by utilizing ordered subsets and block-diagonal, or 1×1 blocks for non-spectral CT, paraboloid approximations, i.e. denominator terms, of the cost function.

In other words, the reconstructing may be performed by a calculation of a single pre-computable block-diagonal denominator term for the data term of the cost function for all subsets of projection data, taking into account the distribution of the block-diagonal denominator terms over all subsets for the calculation of the pre-computed denominator, e.g. by using the variance of the values or the generalized-mean.

In other words, according to an example, a separable paraboloid surrogate based method may be provided, wherein an iterative reconstruction is combined with ordered-subsets. The method may be applied for the multi-channel case with more than one material image, e.g. for spectral CT.

In other words, the method advantageously allows spectral applications of SPS and may stabilize the algorithm. In the non-spectral approach the separable paraboloid surrogate method may generate a diagonal Hessian approximation of the cost function, i.e. the neighboring voxels are decoupled and updated separately. In the spectral case neighboring voxels may also be decoupled. However, the additional coupling of the materials for each voxel may be kept.

Therefore, the approximation of the Hessian may be no longer diagonal, but block-diagonal, i.e., the sub-matrix for each voxel is non-diagonal. The entries of each sub-matrix will fluctuate over the individual subsets.

The term "denominator" as used by the present invention may refer to the inverse of the diagonal matrix, which is used for approximating the Hessian matrix of the cost function.

The term "pre-computable denominator term" or "pre-computed denominator term" as used by the present invention may refer to an estimated value or an appropriate approximate value which can be used for a faster, since less complex calculation.

A further, second aspect of the present invention relates to a medical imaging system comprising a device according to the first aspect or according to any implementation form of the first aspect.

A further, third aspect of the present invention relates to a method for reconstructing an X-ray tomography image, the method comprising the steps of:

i) utilizing an ordered subset maximum likelihood optimization with a diagonal paraboloid approximation of a cost function for the reconstructing of the X-ray tomography image by means of an reconstruction module; and
ii) calculating a pre-computable denominator term for the cost function for a plurality of subsets of projection data based on a distribution of diagonal denominator terms over the plurality of the subsets of the projection data by means of a calculation module.

According to an exemplary embodiment of the present invention, the calculation module is configured to use from the distribution of the diagonal denominator terms
i) a variance of the diagonal denominator terms; and/or
ii) a generalized-mean of the diagonal denominator terms.

This advantageously provides that a safe and reliable estimation for the pre-computable denominator terms is used.

According to an exemplary embodiment of the present invention, the calculation module is configured to calculate the pre-computable denominator term for the cost function based on a comparison of the diagonal denominator terms with at least one threshold value. This advantageously allows that an adapted estimation for the diagonal denominator terms is used.

According to an exemplary embodiment of the present invention, the calculation module is configured to calculate the pre-computable denominator term for the cost function based on a maximum value of the diagonal denominator terms if the at least one threshold value is exceeded. This advantageously allows a safe estimation for the diagonal denominator terms a safe calculation of the pre-computable denominator term.

According to an exemplary embodiment of the present invention, the calculation module is configured to calculate the pre-computable denominator term for a data term of the cost function.

According to an exemplary embodiment of the present invention, the reconstruction module is configured to utilize the diagonal paraboloid approximation of the cost function in terms of a block diagonal paraboloid approximation for the reconstructing of the X-ray tomography image in terms of a spectral image and wherein the calculation module is configured to calculate the pre-computable denominator term for the cost function for a plurality of subsets of projection data based on a distribution of block diagonal denominator terms over the plurality of the subsets of the projection data. This advantageously provides that many fewer flops per iteration are required than for instance in ordered subset expectation maximization algorithm and using separable paraboloid surrogates provides that it is guaranteed to be monotonic, even with nonzero background events.

According to an exemplary embodiment of the present invention, the reconstruction module is configured to transform the block diagonal denominator terms into weighted sums of multidimensional paraboloids, wherein the multidimensional paraboloids are chosen equally for all subsets. This advantageously provides an overall, non-separable paraboloidal surrogate function.

According to an exemplary embodiment of the present invention, the reconstruction module is configured to use convex multidimensional paraboloids and/or concave multidimensional paraboloids in the weighted sum of multidimensional paraboloids. This advantageously allows an efficient sum generation of parabolas to obtain an overall, non-separable paraboloidal surrogate function.

According to an exemplary embodiment of the present invention, the reconstruction module is configured to provide positive coefficients in the weighted sum of the multidimensional convex and concave paraboloids. This advantageously allows an efficient sum generation of the multidimensional convex and concave paraboloids.

According to an exemplary embodiment of the present invention, the reconstruction module is configured to derive a single weight for each of the chosen multidimensional paraboloids from the plurality of weights for this chosen multidimensional paraboloid over plurality of subsets by taking into account the distribution of the weights over the subsets. This advantageously allows an efficient sum generation.

According to an exemplary embodiment of the present invention, the generalized mean is used to derive the single weight over the subsets for each multidimensional paraboloid, wherein a first parameter of the generalized mean is used for convex paraboloids and a second parameter of the generalized mean is used for concave paraboloids. This advantageously allows an efficient sum generation.

According to an exemplary embodiment of the present invention, the pre-computable denominator is calculated from the weighted sum of multidimensional paraboloids based on calculated single weights. This advantageously allows an improved sum generation.

According to an exemplary embodiment of the present invention, the reconstruction module is configured to define a plurality of voxels in the subset of spectral denominator images and configured to define subsets of the plurality of the voxels depending on a material of each voxel of the plurality of the voxels, wherein preferably the approximation module is configured to couple each voxel of one subset. This advantageously allows an improved voxel generation.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) or an EPROM (Erasable Programmable Read Only Memory). A computer-readable medium may also be a data communication network, for example the Internet, which allows downloading a program code.

The methods, systems, and devices described herein may be implemented as software in a Digital Signal Processor, DSP, in a micro-controller or in any other side-processor or as a hardware circuit within an application specific integrated circuit, ASIC, CPLD or FPGA.

The present invention can be implemented in digital electronic circuitry or in computer hardware, firmware, software, or in combinations thereof, for instance in available hardware of conventional medical imaging or image reconstructing devices or in new hardware dedicated for processing the methods described herein.

BRIEF DESCRIPTION OF THE DRAWINGS

Exemplary embodiments of the invention will be described in the following with reference to the following drawings, which are not to scale, wherein.

DETAILED DESCRIPTION OF EMBODIMENTS

Figure 1:
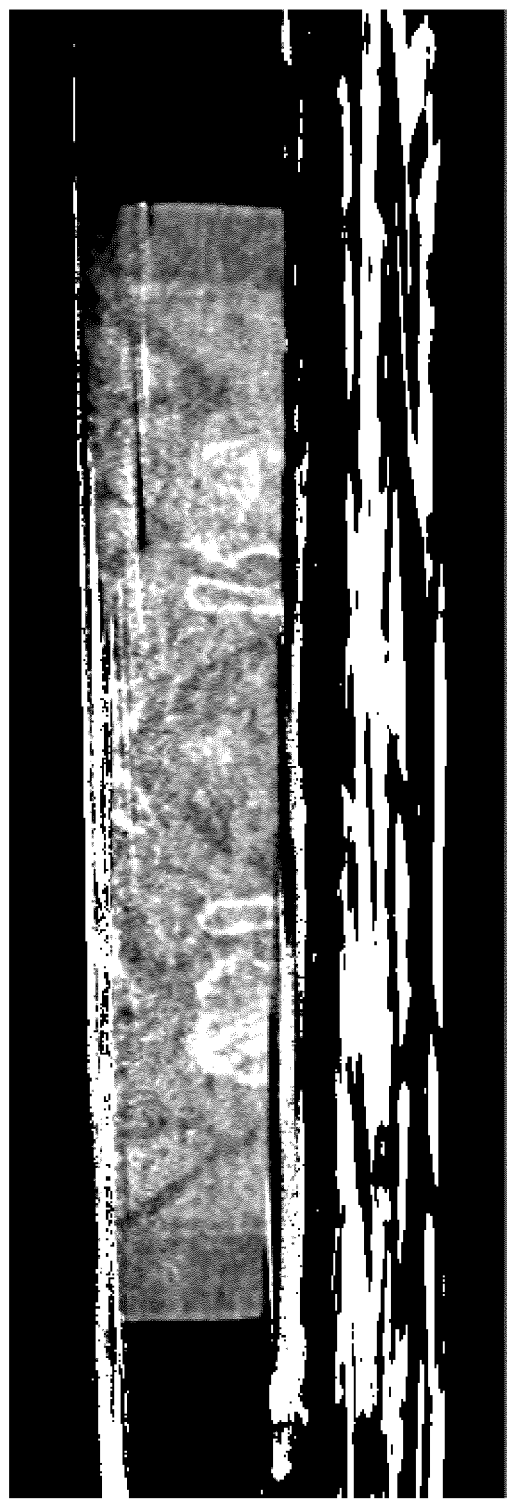
FIG. 1 shows a schematic diagram of an approach for providing a coronal view of a CT reconstruction in the hip region for explaining the present invention.

The illustration in the drawings is purely schematic and does not intend to provide scaling relations or size information. In different drawings, similar or identical elements are provided with the same reference numerals. Generally, identical parts, units, entities or steps are provided with the same reference symbols in the description.

FIG. 1 shows a schematic diagram of an approach providing a coronal view of a CT reconstruction in the hip region for explaining the present invention.

In the ordered subset approach only a small amount of data is used per sub-iteration for the calculation of the gradient applied in the Newton-like update. In contrast, the denominator is commonly pre-computed, determined only once before the following iterations, using the full dataset, and therefore, needs scaling to have the right magnitude for the smaller subset. It is crucial to account for the local usage of projection data in the volume, i.e. how much projection data really contributed to a voxel, when it comes to calculate the local scaling of the pre-computed denominator.

Failures in the scaling, in the worst case, lead to a divergence of the algorithm, which renders the reconstruction results useless. Spectral SPS approaches can be even more sensitive as they use multiple "denominator" images in combination with matrix inversion operations in each pixel. An example for an unstable reconstruction and a stable reconstruction are shown in FIG. 1. and FIG. 2, respectively.

In FIG. 1, the scatter image of the coronal view of a CT reconstruction is shown. The conventional approach is prone to instabilities arising at the upper and lower ends of the scan, which then emerge into the volume. In FIG. 1, the Level/Window ratio was set to Level/Window=−50/500 HU, wherein HU is the abbreviation for Hounsfield units.

Figure 2:
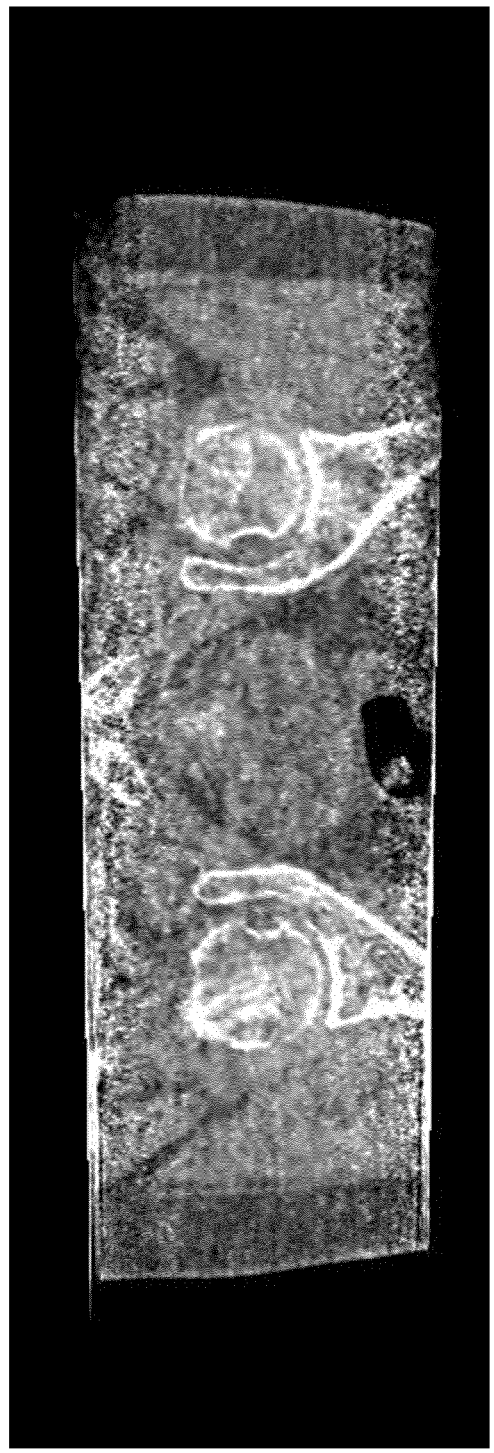
FIG. 2 shows a schematic diagram of a coronal view of a CT reconstruction in the hip region according to an exemplary embodiment of the present invention.

FIG. 2 shows a schematic diagram of a coronal view of a CT reconstruction in the hip region according to an exemplary embodiment of the present invention. In FIG. 2, also the Level/Window ratio was set to Level/Window=−50/500 HU.

Figure 3:
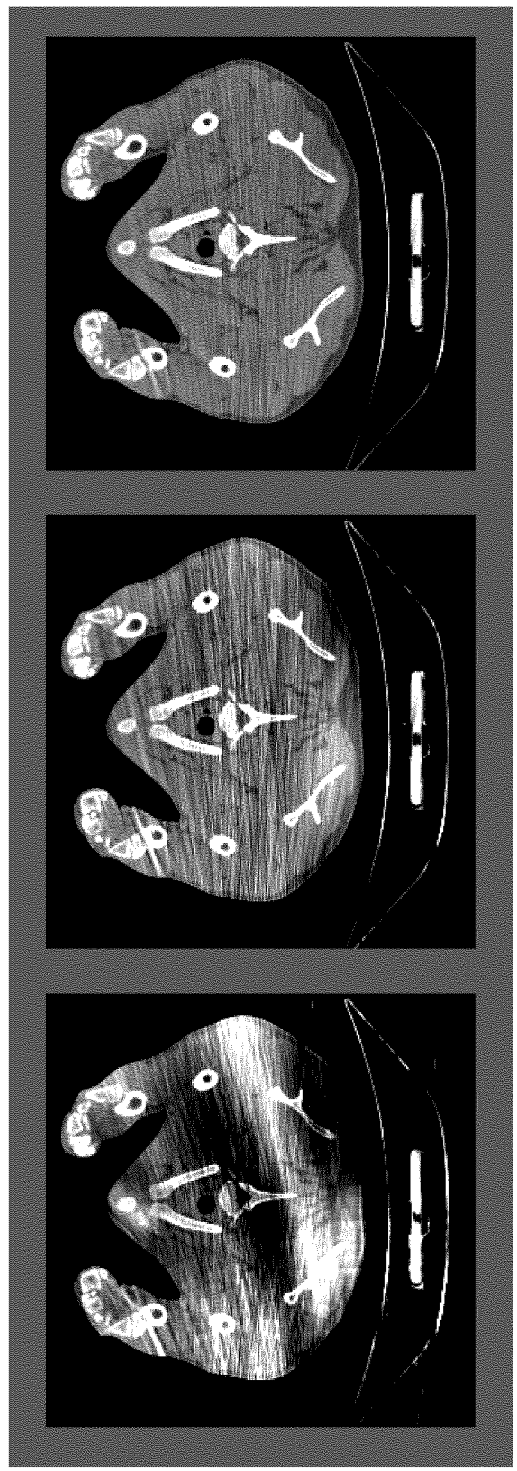
FIG. 3 shows a schematic diagram of one boundary slice of an iterative reconstruction without regularization for explaining the present invention.

FIG. 3 shows a schematic diagram of one boundary slice of an iterative reconstruction without regularization for explaining the present invention.

FIG. 3 shows one boundary slice of an iterative reconstruction without regularization. On the left of FIG. 3, no pre-calculated denominator is used. The middle part shows a pre-calculated denominator $d_{dj}^{\Omega}/S$. On the right part of FIG. 3, a pre-calculated denominator $d_{dj}^{pre}$ is shown.

According to an exemplary embodiment of the present invention, an improvement of iterative reconstruction algorithms utilizing ordered subsets and pre-calculated denominators that reduces artifacts in the boundary slices and prevents instabilities during reconstruction.

According to an exemplary embodiment of the present invention, the device 100 may be configured that the structure of a typical update equation for a method utilizing ordered subsets and pre-calculated denominator is given by $$\mu_j^{n,s+1} = \mu_j^{n,s} + \frac{n_{dj}^{n,s} + n_{rj}^{n,s}}{d_{dj}^{\Omega}/S + d_{rj}^{n,s}}$$

wherein $\mu_j^{n,s}$ the value of the j-th voxel in the s-th sub-iteration of the n-th iteration. $n_{dj}^{n,s}$ is the first derivative of the data term, $n_{rj}^{n,s}$ is the first derivative of the regularization term, and $d_{rj}^{n,s}$ is the second derivative of the regularization term, all for the j-th voxel in the s-th sub-iteration in the n-th iteration. All these terms depend on the current image values $\mu_j^{n,s}$. $d_{dj}^{\Omega}$ is the pre-calculated second derivative of the data term for all projections and S the number of subsets. $d_{dj}^{\Omega}$ does not depend on the current image values $\mu_j^{n,s}$ and in consequence not on the iteration number n and the sub-iteration number s, and thus has to be calculated only once. It can be calculated by summing up the second derivatives of the data term for all subsets:

$$d_{dj}^{\Omega} = \sum_{s=1}^{S} d_{dj}^{s}$$

Thus, $d_{dj}^{\Omega}/S$ is the mean second derivative of the data term over the subsets. This update equation works only well if it can be assumed that $d_{dj}^{\Omega}/S$ is a reasonably good approximation for each term $d_{dj}^{s}$. If only few data are available for a certain image region, this assumption does not hold anymore. Two scenarios occur: $d_{dj}^{\Omega}/S$ is significantly larger than $d_{dj}^{s}$ for a certain subset. This leads to reduced update due to the comparably high value of the denominator in the update equation.

Thus, according to an exemplary embodiment of the present invention, the device 100 may be configured to provide a reduced speed of convergence in this image region for this specific subset, which is normally not critical with respect to stability of the reconstruction.

The other scenario is that $d_{dj}^{\Omega}/S$ is significantly lower than $d_{dj}^{s}$ for a certain subset. This leads to an increased update (especially for low or no regularization) due to the comparably low value of the denominator in the update equation.

For the unregularized case, factors of up to 20 were observed for the ratio of $d_{dj}^{s}$ and $d_{dj}^{\Omega}/S$. An over-relaxation by such s factor can easily lead to instabilities in the reconstruction. The device 100 may be configured to provide the following method to avoid this instabilities.

According to an exemplary embodiment of the present invention, the device 100 may be configured to provide that instabilities would not occur, if for each voxel the maximal values over all $d_{dj}^{s}$ is taken as the pre-calculated denominator instead of the mean value $$d_{dj}^{max} = \max_s d_{dj}^{s},$$

because in this case, only under-relaxation would occur for the updates. This however would decrease speed of convergence in all image regions. Thus it is desirable to apply the maximum instead of the mean only on those regions, where indeed large deviations between the values $d_{dj}^{s}$ and $d_{dj}^{\Omega}/S$ can occur. To evaluate this, one could calculate the variance $\sigma_{dj}$ of the $d_{dj}^{s}$ and take this as a measure to evaluate if $d_{dj}^{max}$ or $d_{dj}^{\Omega}/S$ should be used as pre-calculated denominator by the device 100.

To avoid artifacts due to sharp transitions between these two options, a smooth transition using two thresholds should be applied by the device 100 using threshold values for the denominator terms:

$$d_{dj}^{pre} = \begin{cases} d_{dj}^{max} & t_h \leq \sigma_{dj} \\ d_{dj}^{\Omega}/S + \frac{\sigma_{dj} - t_l}{t_h - t_l}(d_{dj}^{max} - d_{dj}^{\Omega}/S) & t_l < \sigma_{dj} < t_h \\ d_{dj}^{\Omega}/S & \sigma_{dj} \leq t_l \end{cases}$$

Thus, the update equation is now as follows:

$$\mu_j^{n,s+1} = \mu_j^{n,s} + \frac{n_{dj}^{n,s} + n_{rj}^{n,s}}{d_{dj}^{pre} + d_{rj}^{n,s}}$$

According to an exemplary embodiment of the present invention, the device 100 may be configured to perform these calculations based on data acquired with a CT scanner. The reconstruction images are shown in FIG. 3 and FIG. 4 for two different boundary slices.

For the example in FIG. 3 severe artifacts occur if no pre-calculated denominator is used by the device 100, since the assumption that each subset is a good approximation of the whole dataset is not fulfilled here.

If the conventional pre-calculated denominator is used, these artifacts are reduced, some of the subsets are under-regularized, reducing the problem of an extreme limit-cycle, but still quite strong. If the pre-calculated denominator of the exemplary embodiment, described above, is used, these remaining artifacts are reduced significantly.

Figure 4:
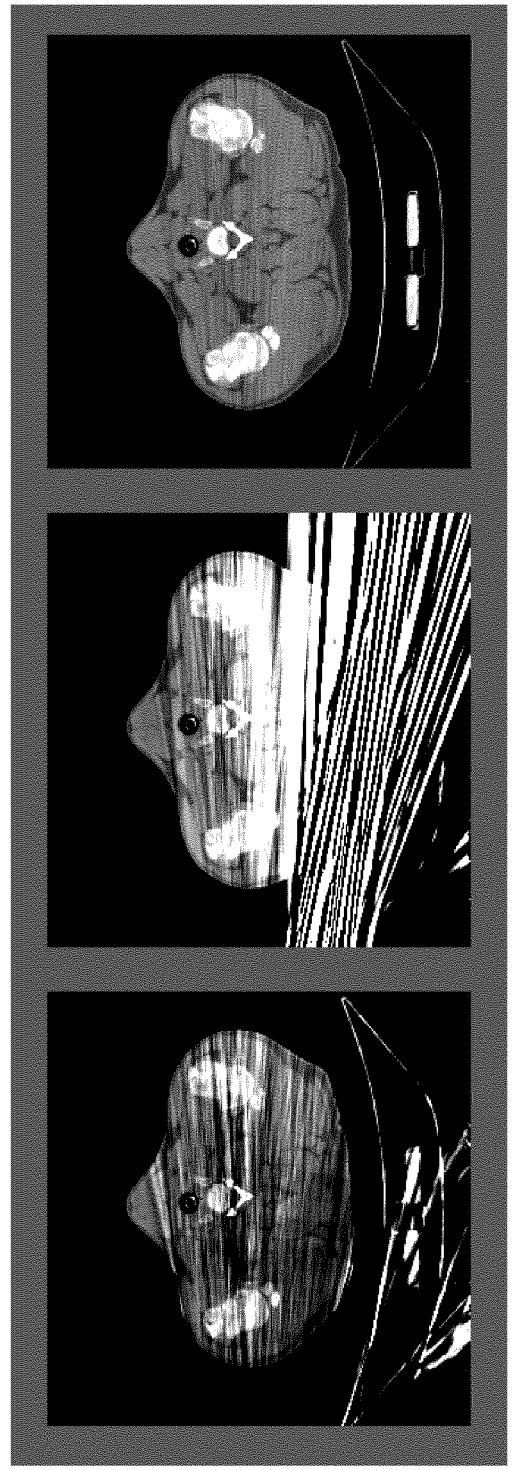
FIG. 4 shows a schematic diagram of a coronal view of a CT reconstruction in the hip region for explaining the present invention.

FIG. 4 shows a schematic diagram of a coronal view of a CT reconstruction in the hip region for explaining the present invention. Also in FIG. 4, if the conventional pre-calculated denominator is used, these remaining artifacts are reduced significantly, but here the over-relaxation of some subsets for the conventional pre-calculated denominator leads clearly to instability of the reconstruction.

Figure 5:
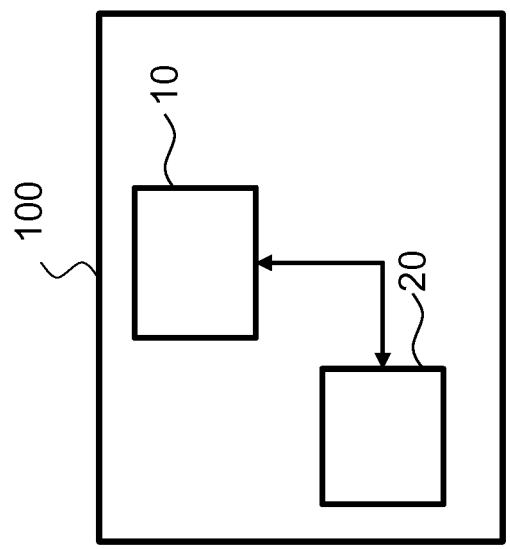
FIG. 5 shows a schematic diagram of a device for iteratively reconstructing a spectral X-ray computed tomography image according to an exemplary embodiment of the present invention.

FIG. 5 shows a schematic diagram of a device for iteratively reconstructing a spectral X-ray computed tomography image according to an exemplary embodiment of the present invention.

The device 100 comprises a reconstruction module 10 and a calculation module 20.

The reconstruction module 10 is configured to utilize an ordered subset maximum likelihood optimization with a diagonal paraboloid approximation of a cost function for the reconstructing of the X-ray tomography image.

The calculation module 20 is configured to calculate a pre-computable denominator term for the cost function for a plurality of subsets of projection data based on a distribution of diagonal denominator terms over the plurality of the subsets of the projection data.

In other words, according to an exemplary embodiment of the present invention, one—or at least only a few, for instance two or three different—pre-computable denominator term for the cost function is calculated based on the plurality of diagonal denominator terms over the plurality of the subsets of the projection data.

According to an exemplary embodiment of the present invention, the device 100 is used for the spectral case, the device 100 is configured to decouple neighboring voxels. The additional coupling of the materials for each voxel is kept.

Therefore, the device 100 may be configured to perform an approximation of the Hessian that is no longer diagonal, but block-diagonal, i.e., the sub-matrix for each voxel is non-diagonal.

According to an exemplary embodiment of the present invention, the device 100 may be configured to perform calculation, wherein the entries of each sub-matrix will fluctuate over the individual subsets.

According to an exemplary embodiment of the present invention, a split of a sub-matrix is proposed which divides the matrix in several subcomponents, each defining either a convex or a concave paraboloid in the n-dimensional material domain.

According to an exemplary embodiment of the present invention, the device 100 may be configured to scale each paraboloid with a positive scalar.

According to an exemplary embodiment of the present invention, in each pixel i the device 100 may be configured to get three denominator images, which describe Hessian matrixes:

$$H_i = \begin{pmatrix} h_{00,i} & h_{01,i} \\ h_{10,i} & h_{11,i} \end{pmatrix} \text{ with } h_{01,i} = h_{10,i}$$

Each matrix corresponds to a 2-dimensional paraboloid $\vec{x}^T H_i \vec{x}$

According to an exemplary embodiment of the present invention, in order to make them comparable, the device 100 may be configured to split the denominator into two parts $$H_i = \begin{pmatrix} h_{00,i} + |h_{10,i}| & 0 \\ 0 & h_{11,i} + |h_{01,i}| \end{pmatrix} + \begin{pmatrix} -|h_{10,i}| & h_{01,i} \\ h_{10,i} & -|h_{01,i}| \end{pmatrix}$$

According to an exemplary embodiment of the present invention, the device 100 may be configured to provide the denominator further in a sum of convex and concave components.

$$H_i = a_i \begin{pmatrix} 1 & 0 \\ 0 & 0 \end{pmatrix} + b_i \begin{pmatrix} 0 & 0 \\ 0 & 1 \end{pmatrix} + c_i \begin{pmatrix} 1 & 1 \\ 1 & 1 \end{pmatrix} - d_i \begin{pmatrix} 1 & -1 \\ -1 & 1 \end{pmatrix}$$

where the device 100 may then further be configured to process purely positive coefficients or weights $a_i = h_{00,i} + |h_{10,i}|$ $b_i = h_{11,i} + |h_{01,i}|$ $c_i = |h_{01,i}|$ if $h_{01,i} < 0$ otherwise 0

$d_i = |h_{01,i}|$ if $h_{01,i} \geq 0$ otherwise 0

According to a further exemplary embodiment of the present invention, the worst case paraboloid over the subsets is performed by the device 100: It is the one with the largest coefficient for the convex paraboloids and the smallest coefficient for the concave paraboloids. This will lead in total to a summed paraboloid with the steepest increases.

According to an exemplary embodiment of the present invention, the device 100 may be configured to track which is the highest/lowest coefficient that occurs for each subset.

In the single channel case, the device 100 may be configured to choose to increase the denominator by i) either a factor depending on the standard deviation over the denominator images along the subsets or ii) by taking the maximum over all denominator images along the subsets.

According to a further exemplary embodiment of the present invention, the device 100 may be configured to increase $a_i$ and $b_i$ (paraboloid gets steeper) and/or to decrease $c_i$ and $d_i$, adding less concave paraboloids, this makes the weighted combination of paraboloids also steeper.

According to a further exemplary embodiment of the present invention, the device 100 may be configured to take maximum $a_i$ and maximum $b_i$ for further calculation and reconstruction.

According to a further exemplary embodiment of the present invention, the device 100 may be configured to take minimum $c_i$ and minimum $d_i$ for further calculation and reconstruction.

According to a further exemplary embodiment of the present invention, the device 100 may be configured to provide as a result:
i) a paraboloid that lies above each other paraboloids of the subsets; and/or
ii) a correlation axis, i.e. properties do not change if the correlations of the individual paraboloids do not change over the subsets.

According to an exemplary embodiment of the present invention, instead of using the worst-case paraboloid the device 100 may be configured to select a solution between the mean solution and the worst-case solution. For this the so-called generalized mean is taken over the occurring coefficients in each image pixel position. This gives the flexibility to relax the constraints as the worst case paraboloid might yield a slower convergence.

According to an exemplary embodiment of the present invention, instead of using the worst-case paraboloid the device 100 may be configured to choose the denominator freely between the mean over all subsets, or the steeped fitting paraboloid that lies above each overs. In other words, the device 100 may be configured to provide the generalized mean, also called "Hoelder-Mittel" in German.

In other words, the device 100 may be configured to take p for the coefficients of the convex parts and (2−p) for the coefficients of the concave parts. This advantageously provides that larger p means more conservative choice for the paraboloids. With p=1 the device 100 gets the same results as before with the other method.

Figure 6:
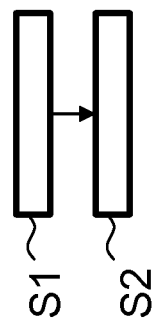
FIG. 6 shows a schematic diagram of a flow-chart diagram for a method for iteratively reconstructing a spectral X-ray computed tomography image.

FIG. 6 shows a schematic diagram of a flow-chart diagram for a method for iteratively reconstructing a polyenergetic X-ray computed tomography image.

As a first step of the method, utilizing S1 an ordered subset maximum likelihood optimization with a diagonal paraboloid approximation of a cost function for the reconstructing of the X-ray tomography image by means of a reconstruction module 10 may be performed.

As a second step of the method, calculating S2 a pre-computable denominator term for the cost function for a plurality of subsets of projection data based on a distribution of the diagonal denominator terms over the plurality of the subsets of the projection data by means of a calculation module 20 may be performed.

The present disclosure also supports a computer program product including computer executable code or computer executable instructions that, when executed, causes at least one computer to execute the performing and computing steps described herein.

It has to be noted that embodiments of the present invention are described with reference to different subject-matters. In particular, some embodiments are described with reference to method type claims, whereas other embodiments are described with reference to the device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined providing synergetic effects that are more than the simple summation of these features.

While the invention has been illustrated and described in detail in the drawings and foregoing description, such illustration and description are to be considered illustrative or exemplary and not restrictive; the present invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be considered as limiting the scope.

The invention claimed is:

1. A computer-implemented device for reconstructing an X-ray tomography image, the device comprising:
   a memory storage configured to store computer executable instructions; and
   at least one processor configured to execute the computer executable instructions to configure the device to:
   utilize an ordered subset maximum likelihood optimization with a diagonal paraboloid approximation of a cost function for reconstructing the X-ray tomography image;
   calculate a pre-computable denominator term for the cost function for a plurality of subsets of projection data based on a distribution of diagonal denominator terms over the plurality of the subsets of the projection data;
   define a plurality of voxels in a subset of spectral denominator images, and define subsets of the plurality of the voxels depending on a material of each voxel of the plurality of the voxels.

2. The device according to claim 1, wherein the at least one processor is configured to use from the distribution of the diagonal denominator terms
   a variance of the diagonal denominator terms; and/or
   a generalized-mean of the diagonal denominator terms.

3. The device according to claim 1, wherein the at least one processor is configured to calculate the pre-computable denominator term for the cost function based on a comparison of the diagonal denominator terms with at least one threshold value.

4. The device according to claim 3, wherein the at least one processor is configured to calculate the pre-computable denominator term for the cost function based on a maximum value of the diagonal denominator terms if the at least one threshold value is exceeded.

5. The device according to claim 1, wherein the at least one processor is configured to calculate the pre-computable denominator term for a data term of the cost function.

6. The device according to claim 1, wherein the at least one processor is configured to utilize the diagonal paraboloid approximation of the cost function in terms of a block diagonal paraboloid approximation for the reconstructing of the X-ray tomography image in terms of a spectral image, and wherein the at least one processor is configured to calculate the pre-computable denominator term for the cost function for a plurality of subsets of projection data based on a distribution of block diagonal denominator terms over the plurality of the subsets of the projection data.

7. The device according to claim 6, wherein the at least one processor is configured to transform the block diagonal denominator terms into weighted sums of multidimensional paraboloids, wherein the multidimensional paraboloids are chosen equally for all subset.

8. The device according to claim 7, wherein the at least one processor is configured to use convex multidimensional paraboloids and/or concave multidimensional paraboloids in the weighted sum of multidimensional paraboloids.

9. The device according to claim 8, wherein the at least one processor is configured to provide positive coefficients in the weighted sum of the multidimensional convex and concave paraboloids.

10. The device according to claim 7, wherein the at least one processor is configured to derive a single weight for each of the chosen multidimensional paraboloids from the plurality of weights for this chosen multidimensional paraboloid over plurality of subsets by taking into account the distribution of the coefficients over the subsets.

11. The device according to claim 10, wherein the generalized mean is used to derive the single weight over the subsets for each multidimensional paraboloid, wherein a first parameter of the generalized mean is used for convex paraboloids and a second parameter of the generalized mean is used for concave paraboloids.

12. The device according to claim 11, wherein the pre-computable denominator is calculated from the weighted sum of multidimensional paraboloids based on calculated single weights.

13. A medical imaging system comprising a device according to claim 1.

14. A computer-implemented method for reconstructing an X-ray tomography image, the method comprising:
  utilizing an ordered subset maximum likelihood optimization with a diagonal paraboloid approximation of a cost function for reconstructing the X-ray tomography image;
  calculating a pre-computable denominator term for the cost function for a plurality of subsets of projection data based on a distribution of diagonal denominator terms over the plurality of the subsets of the projection data;
  defining a plurality of voxels in a subset of spectral denominator images and defining subsets of the plurality of the voxels depending on a material of each voxel of the plurality of the voxels.

* * * * *